US012626331B2

(12) United States Patent
Wong et al.

(10) Patent No.: US 12,626,331 B2
(45) Date of Patent: May 12, 2026

(54) TRANSLATIONAL RAPID ULTRAVIOLET-EXCITED SECTIONING TOMOGRAPHY ASSISTED WITH DEEP LEARNING

(71) Applicant: The Hong Kong University of Science and Technology, Hong Kong (CN)

(72) Inventors: Tsz Wai Wong, Hong Kong (CN); Wentao Yu, Hong Kong (CN); Yan Zhang, Hong Kong (CN); Lei Kang, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 296 days.

(21) Appl. No.: 18/699,373

(22) PCT Filed: Aug. 29, 2022

(86) PCT No.: PCT/CN2022/115419
§ 371 (c)(1),
(2) Date: Apr. 8, 2024

(87) PCT Pub. No.: WO2023/061068
PCT Pub. Date: Apr. 20, 2023

(65) Prior Publication Data
US 2024/0412324 A1 Dec. 12, 2024

Related U.S. Application Data

(60) Provisional application No. 63/254,546, filed on Oct. 12, 2021.

(51) Int. Cl.
*G06T 3/4046* (2024.01)
*G06T 7/00* (2017.01)

(52) U.S. Cl.
CPC .......... *G06T 3/4046* (2013.01); *G06T 7/0012* (2013.01); *G06T 2207/10064* (2013.01);
(Continued)

(58) Field of Classification Search
CPC ..... G06T 3/4046; G06T 7/0012; G06T 7/337; G06T 2207/10064; G06T 2207/20081;
(Continued)

(56) References Cited

U.S. PATENT DOCUMENTS 8,143,600 B2 3/2012 Seibel et al.
2019/0333199 A1* 10/2019 Ozcan ................... G06T 3/4046
(Continued)

OTHER PUBLICATIONS

Zhang H, Fang C, Xie X, Yang Y, Mei W, Jin D, Fei P. High-throughput, high-resolution deep learning microscopy based on registration-free generative adversarial network. Biomed Opt Express. Feb. 4, 2019;10(3):1044-1063. doi: 10.1364/BOE.10.001044. PMID: 30891329; PMCID: PMC6420277. (Year: 2019).*
(Continued)

*Primary Examiner* — Chan S Park
*Assistant Examiner* — Paulo Andres Garcia
(74) *Attorney, Agent, or Firm* — S&F/WEHRW

(57) ABSTRACT

Translational rapid ultraviolet-excited sectioning tomography (TRUST) applies ultraviolet (UV) excitation to a sample and images fluorescence and autofluorescence emission for tomographically imaging the sample. Deep-learning neural networks are used to achieve higher imaging speed and imaging resolution. In one use, fluorescence images acquired with relatively low imaging resolution can be transformed into high-resolution images through the first conditional generative adversarial network (cGAN), a super-resolution neural network (e.g., ESRGAN), which is also helpful for reducing the image scanning time. In another use, the second cGAN, such as Pix2Pix, is used to realize virtual (Continued)

optical sectioning to enhance the axial resolution of the imaging system. Compared to the conventional pattern illumination methods (e.g., HiLo microscopy), which need at least two shots for each field of view, the imaging speed is also times higher because only one shot under the uniform-illumination condition of UV irradiation is required.

8 Claims, 12 Drawing Sheets

(52) U.S. Cl.
CPC ............... *G06T 2207/20081* (2013.01); *G06T 2207/20084* (2013.01)

(58) Field of Classification Search
CPC . G06T 2207/20084; G06T 2207/10056; G06T 2207/30024; G06T 11/00; G06T 11/10; G06T 2210/41; G06T 5/60; G01N 21/6486; G01N 21/6458; G01N 15/1433; G01N 15/1434; G01N 2015/1006; G01N 1/30; G01N 1/312; G01N 2001/302; G06V 20/698; G06V 20/693; G06V 20/695; G06V 2201/034; G06V 2201/03; G06V 10/761; G06V 10/774; G06V 10/82; G02B 21/0076; G02B 21/0032; G02B 21/16; G02B 21/361; G02B 21/367; G16H 30/40; G16H 50/20
See application file for complete search history.

(56) References Cited

U.S. PATENT DOCUMENTS

| | | | | |
|---|---|---|---|---|
| 2021/0132350 | A1 | 5/2021 | Fereidouni et al. | |
| 2021/0321963 | A1* | 10/2021 | Manor | G06T 11/00 |
| 2022/0198689 | A1* | 6/2022 | Winetraub | G06V 10/757 |
| 2023/0030424 | A1* | 2/2023 | Ozcan | G06V 20/698 |

OTHER PUBLICATIONS

Y. Zhu, Z. Zhou, G. Liao and K. Yuan, "Csrgan: Medical Image Super-Resolution Using A Generative Adversarial Network, " 2020 IEEE 17th International Symposium on Biomedical Imaging Workshops (ISBI Workshops), Iowa City, IA, USA, 2020, pp. 1-4, doi: 10.1109/ISBIWorkshops50223.2020.9153436. (Year: 2020).*

W. Liu, K. C. Toussaint, C. Okoro, D. Zhu, Y. Chen, C. Kuang, X. Liu, Laser & Photonics Reviews 2018, 12, 1700333. https://doi. org/10.1002/lpor.201700333 (Year: 2018).*

Seiriki, K., Kasai, A., Nakazawa, T et al. Whole-brain block-face serial microscopy tomography at subcellular resolution using FAST . Nat Protoc 14, 1509-1529 (2019). https://doi.org/10.1038/ s41596-019-0148-4 (Year: 2019).*

Zhang, Hao & Tingting, Zhu & Chen, Xiongchao & Zhu, Lanxin & Jin, Di & Fei, Peng. (2021). Super-resolution Generative Adversarial Network (SRGAN) Enabled On-chip Contact Microscopy. Journal of Physics D: Applied Physics. 54. 10.1088/1361-6463/ac1138. (Year: 2021).*

Amir Qorbani, Farzad Fereidouni, Richard Levenson, Sana Y. Lahoubi, Zachary T. Harmany, Austin Todd and Maxwell A. Fung; Microscopy with ultraviolet surface excitation (MUSE): A novel approach to real-time inexpensive slide-free dermatopathology; Qorbani et al.

Farzad Fereidouni; Ananya Datta Mitra, Stavros Demos; Richard Levenson; Microscopy with UV Surface Excitation (MUSE) for slide-free histology and pathology imaging.

Bilal Malik, Austin Todd, Alyson Terry, Farzad Fereidouni, Rajni Natesan, John Klock, James Wiskin, Mark Lenox and Richard Levenson; Radiologic-pathologic validation of transmission ultrasound tomography using microscopy with UV surface excitation.

Zhenghui Chen, Wentao Yu, Ivy H. M. Wong, and Terence T. W. Wong; Deep-learning-assisted microscopy with ultraviolet surface excitation for rapid slide-free histological imaging; vol. 12, No. 9 / Sep. 1, 2021.

* cited by examiner

TRANSLATIONAL RAPID ULTRAVIOLET-EXCITED SECTIONING TOMOGRAPHY ASSISTED WITH DEEP LEARNING

CROSS-REFERENCE TO RELATED APPLICATIONS

This application claims priority to, and the benefit of, U.S. Provisional Patent Application No. 63/254,546 filed on Oct. 12, 2021, the disclosure of which is hereby incorporated by reference in its entirety.

LIST OF ABBREVIATIONS

3D: three-dimensional
AO: acridine orange
CAR: content adaptive resampler
cGAN: conditional generative adversarial network
CPU: central processing unit
CNN: convolutional neural network
CT: computed tomography
DAPI: 4',6-diamidino-2-phenylindole
Deep-TRUST: TRUST assisted with deep learning
DMD: digital micromirror device
ESRGAN: enhanced super-resolution generative adversarial network
FFPE: formalin-fixed, paraffin-embedded
FOV: field of view
FWHM: full width at half maximum
GPU: graphics processing unit
HR: high-resolution
LD: laser diode
LED: light emitting diode
LR: low-resolution
MCU: microcontroller unit
NA: numerical aperture
NBF: neutral-buffered formalin
Patterned-TRUST: TRUST with patterned illumination
PBS: phosphate-buffered saline
PI: propidium iodide
RAM: random access memory
RS: super-resolution
SRGAN: super-resolution generative adversarial network
TRUST: translational rapid ultraviolet-excited sectioning tomography
UV: ultraviolet

TECHNICAL FIELD

The present invention relates generally to tomographic imaging of fluorescence and autofluorescence emission of a sample irradiated with UV light. In particular, the present invention relates to Deep-TRUST, which uses neural networks to process TRUST images to improve imaging resolution and reduce imaging time.

BACKGROUND

It is still laborious and time-consuming to acquire 3D information of large biological samples with high resolution. For most 3D fluorescence microscopes, the time cost of tissue preparation for large samples can be extremely high (e.g., ~2 weeks for whole mouse brain clearing or staining) [5]-[8]. Moreover, some tissue processing protocols can induce side effects and degrade imaging quality. For whole organ staining, it is difficult to optimize all involved chemical or physical parameters to realize a consistent staining appearance in both the central and peripheral areas for samples with different tissue types or sizes. As for optical clearing, there are still several challenges, such as morphological distortion of the sample [9] and toxicity of reagents [10]. Finally, some imaging systems require the scanned sample to be embedded in resin [11], [12] or paraffine [13] block, resulting in additional time cost and uneven shrinkage of the sample due to dehydration.

As for label-free imaging systems, tissue staining is unnecessary, but several other issues must be addressed. To begin with, the imaging specificity may be lower. For example, the imaging contrast of soft tissue (e.g., muscle) can be problematic for micro-CT [14], [15]. Also, the entire experimental time cost of the label-free imaging system is not necessarily lower than that taken by fluorescence imaging systems, even with staining time counted. For example, light-sheet microscopy roughly costs two weeks (including clearing, staining, and optical scanning) for whole mouse brain imaging, while label-free photoacoustic microscopy [17] needs ~2 months.

There is a need in the art for an imaging technique that reduces image acquisition time while maintaining high imaging resolution and high imaging content at a low cost.

SUMMARY

The present invention is concerned with Deep-TRUST, which is related to implementing neural networks on the original TRUST image to enhance its resolution thereof or to realize virtual optical sectioning with a single shot. As a result, the image scanning time is advantageously reduced.

The first aspect of the present invention is to provide the first method for tomographically imaging a sample with UV excitation to yield a fluorescence 3D volume. The first method is used for a Deep-TRUST system. It is related to imaging the sample at a relatively low resolution and then transforming LR TRUST images into HR TRUST images by utilizing a SR neural network which can enhance the resolution of the input image and thus reduce the image scanning time.

The first method comprises: (a) block-face imaging of the exposed surface layer of a tissue block, which is immersed into staining solutions and irradiated with UV light to yield LR fluorescence and autofluorescence images; (b) using a cGAN to transform LR TRUST images into HR TRUST images, wherein the cGAN can also be replaced with other SR neural networks configured and trained to enhance the resolution of the input image, thereby reducing the time required in image scanning in comparison to directly obtaining HR TRUST images; (c) removing the imaged surface layer of the tissue block with mechanical sectioning and exposing the following/adjacent layer; and (d) multiple repetitions of the steps above (a-c) to acquire the whole 3D volume of the imaged sample.

The SR neural network can be SRGAN, ESRGAN, CAR, or another kind of SR deep learning network.

Preferably, the ESRGAN is applied for demonstration.

In certain embodiments, the first method further comprises training the cGAN (e.g., ESRGAN) with a training dataset. The training dataset includes a plurality of training samples. An individual training sample contains a paired example of the LR and HR TRUST images.

In certain embodiments, the first method further comprises staining the individual section before the image scanning.

In certain embodiments, the staining solutions contain fluorogenic probes (e.g., DAPI and PI).

In certain embodiments, each section is an exposed surface of the sample, and the plurality of sections is prepared by serially sectioning the sample.

In certain embodiments, the imaging of the fluorescence and autofluorescence emission of the individual section comprises: gridding the individual section to form a plurality of FOVs to be imaged; and raster-scanning the plurality of FOVs one by one to generate LR TRUST images, wherein each FOV is irradiated with UV light during imaging.

The second aspect of the present invention is to provide the second method for tomographically imaging a sample with UV excitation to yield a 3D fluorescence image volume with higher imaging speed and better axial resolution. The second method, also used for a Deep-TRUST system, adopts another deep-learning neural network to realize virtual optical sectioning and generate a virtual Patterned-TRUST image with a single ordinary TRUST image as the input. Multiple TRUST images acquired under different illumination conditions of UV light (e.g., uniform and speckle illumination) for each FOV are unnecessary, thereby reducing the imaging time.

The second method comprises: (a) focal scanning of the exposed surface layer of the sample, which is immersed under staining solutions and irradiated with UV light to yield TRUST images; (b) removing the imaged surface layer of the tissue block with mechanical sectioning and exposing the following/adjacent layer; (c) multiple repetitions of the steps above (a-b) to form the 3D fluorescence/autofluorescence image volume.

In particular, the focal scanning of the exposed surface layer comprises: (a) obtaining a TRUST image that records fluorescence and autofluorescence emission of the individual section irradiated with UV light under a uniform-illumination condition; and (b) using the first cGAN to process the TRUST image to yield a virtual optically-sectioned TRUST image (virtual Patterned-TRUST image), without a second input image obtained under the speckle-illumination condition, thereby reducing the time required compared to HiLo microscopy; (c) moving the optical imaging system and/or tissue sample axially for a distance, preferably half the optical sectioning thickness; (d) multiple repetitions of the steps above (a-c) to yield a sequence of virtual Patterned-TRUST images.

In certain embodiments, the second method further comprises training the first cGAN (e.g., ESRGAN) with the first training dataset, wherein each training sample comprises a paired example of a TRUST image and a corresponding optically-sectioned TRUST image.

In certain embodiments, the obtaining of the TRUST image comprises imaging the fluorescence and autofluorescence emission of the individual section irradiated with uniform UV light. The imaging of the fluorescence and autofluorescence emission of the individual section irradiated with uniform UV light may comprises: gridding the individual section to form a plurality of FOVs to be imaged; and raster-scanning the plurality of FOVs one by one to generate TRUST images, wherein each FOV is irradiated with uniform UV light during imaging.

In certain embodiments, the obtaining of the TRUST image comprises: imaging the fluorescence and autofluorescence emission of the individual section to yield a LR TRUST image upon uniform UV light condition; and using a second cGAN (e.g., ESRGAN) to process the LR TRUST image to yield a HR TRUST image, wherein the second cGAN is a SR neural network configured and trained to enhance a resolution of an input image, thereby reducing the scanning time in comparison to directly obtaining the HR TRUST image.

The second cGAN may be selected as SRGAN, an ESRGAN, a CAR, or another SR deep learning network.

In certain embodiments, the second method further comprises training the second cGAN with the second training dataset. The second training dataset comprises a plurality of second training samples. An individual second training sample comprises a paired example of the LR TRUST image and the HR TRUST image.

The imaging of the fluorescence and autofluorescence emission upon the uniform UV light condition may comprise: gridding the individual section to form a plurality of FOVs to be imaged; and raster-scanning the plurality of FOVs one by one to generate fluorescence images, wherein each FOV is irradiated with UV light during imaging.

In certain embodiments, the second method further comprises staining the individual section with staining solutions for labeling before image scanning.

In certain embodiments, fluorogenic probes (e.g., DAPI and PI) are preferred for staining the individual section.

In certain embodiments, each section is an exposed surface of the sample, and the plurality of sections is prepared by serially sectioning the sample.

A third aspect of the present invention is to provide a system for tomographically imaging a sample upon UV radiation to yield a 3D volume fluorescence image, where the system implements any of the embodiments of the first and second methods as disclosed above. The disclosed system is a Deep-TRUST system.

The system comprises an imaging subsystem and one or more computers. The imaging subsystem is realized as the TRUST system or the Patterned-TRUST system and is used for imaging the sample upon UV radiation. One or more computers are used for controlling the imaging subsystem and determining the 3D fluorescence image volume. In particular, one or more computers are configured to realize a desired embodiment of the first or second method.

Other aspects of the present disclosure are disclosed as illustrated by the embodiments hereinafter.

BRIEF DESCRIPTION OF THE DRAWINGS

FIG. 1a depicts a schematic of the TRUST system;

FIG. 1b depicts a close-up image of the region marked by the dashed box in FIG. 1a from a different perspective to exhibit more details of the waterproof case;

FIG. 1c depicts imaging results of TRUST without a waterproof case;

FIG. 1d depicts imaging results of TRUST with a waterproof case; and

FIG. 1e depicts a workflow of the whole system.

FIG. 3a depicts a reconstructed 3D model of a fixed mouse brain with red, green, and blue channels;

FIG. 3b depicts 3D structures of nerve tracts or fibers from autofluorescence signal extracted from the green channel in FIG. 3a by background subtraction;

FIGS. 3c-3f depict four reprehensive close-up images in FIG. 3a, respectively;

FIG. 3g depicts one typical section of a mouse heart with the position indicated by a dashed line at the top right corner;

FIG. 3h provides a close-up image of the dashed region on the mouse heart section in FIG. 3g;

FIG. 3i depicts a rendered 3D model of a mouse spleen;

FIG. 3j depicts a 3D distribution of white pulps extracted from FIG. 3i through the blue channel and rendered with pseudo color;

FIG. 3k depicts a close-up image of the white pulp region in FIG. 3i;

FIG. 3l depicts one typical section of the liver with the position indicated by the white dashed line at the top right corner;

FIGS. 3m and 3n depict close-up images of solid and dashed regions in FIG. 3l, respectively; and FIG. 3o depicts a vessel network extracted based on negative contrast and rendered with pseudo color.

FIGS. 4a1-4f2, depicts imaging results of the Patterned-TRUST system (Scale bar: 50 μm), where:

FIGS. 4a1-4b2 provide a comparison of imaging results of fixed mouse brain with 266 nm UV-laser as excitation light source;

FIGS. 4c1-4d2 provide a comparison of imaging results of fixed mouse kidney & lung with 505 nm LD as excitation light source; and FIGS. 4e1-4f2 compare imaging results of fresh mouse brain with 635 nm LD as excitation light source.

FIG. 5a depicts a maximum-intensity projection of the HiLo images of 10 μm-diameter fluorescent microspheres;

FIGS. 5b-5e provide zoomed-in HiLo images of the white dashed region in FIG. 5a at different axial depths;

FIGS. 5f-5i depict the corresponding uniformly illuminated wide-field images;

FIG. 5j depicts an axial intensity distribution of a selected microsphere (indicated by the solid box in FIGS. 5b-5e) with an axial step of 0.5 μm; and FIG. 5k depicts the relationship between axial resolution and optical section parameter σ.

FIGS. 6a1-6a4 depict images from the TRUST system acquired with a 4× objective lens with 0.1 NA;

FIGS. 6b1-6b4 depict images from the TRUST system acquired with a 10× objective lens with 0.3 NA; and FIGS. 6c1-6c4 depict images from the Deep-TRUST system with 4× TRUST images as input.

FIG. 7a depicts an image from the TRUST system with a 10× objective lens with 0.25 NA;

FIG. 7b depicts an image from the Patterned-TRUST system with a 10× objective lens with 0.25 NA; and FIG. 7c depicts an output of a virtual optical sectioning network with the image of FIG. 7a as input.

Skilled artisans will appreciate that elements in the figures are illustrated for simplicity and clarity and have not necessarily been depicted to scale.

DETAILED DESCRIPTION

The present invention discloses a rapid and fully automated 3D imaging system, called Deep-TRUST. Deep-TRUST is developed with the combination of the "translational rapid ultraviolet-excited sectioning tomography (TRUST)" and deep learning. With the help of TRUST, imperfect tissue preparation is greatly simplified. Fresh or fixed tissue without any processing can be directly imaged, and the sample can be labeled during the imaging step by submerging it under staining solutions to improve the speed and uniformity of staining greatly.

Also, the optical scanning of TRUST is fast because of the usage of a low-magnification objective lens (e.g., 4×/0.1 NA). The deteriorated imaging resolution can be later recovered by a SR neural network (e.g., ESRGAN [4]). Another advantage of this implementation is that the imaging system has a higher tolerance to the unevenness of the tissue surface due to the larger depth of field.

In addition to its imaging speed, the imaging resolution of the TRUST system is also excellent. On the one side, its lateral resolution (~1.25 μm) is adequate for sub-cellular imaging. On the other side, although the axial resolution (10~20 μm [13], [17]-[19]) when solely provided by UV surface excitation is much larger, the optical-sectioning method (e.g., HiLo microscopy [20]) can be integrated with TRUST system to achieve much better optical sectioning ability. One drawback of pattern-illumination microscopy is that at least two shots (uniform illumination & speckle illumination) are required for each FOV which significantly increases the time cost. To this end, a deep learning network (e.g., Pix2Pix [3]) can be developed to directly realize virtual optical sectioning with only one shot (which is under uniform illumination).

Finally, high-content imaging can be achieved with TRUST because both the fluorescence and autofluorescence signals can be excited and captured with the help of UV light and a color camera. For example, different fluorescent dyes (DAPI and PI) can be applied to realize better color contrast and reveal more biological information. Also, compared with the light intensity from the autofluorescence background, the light intensity of vessel networks in organs is much lower and can be extracted based on negative contrast.

A. TRUST

Figure 1:
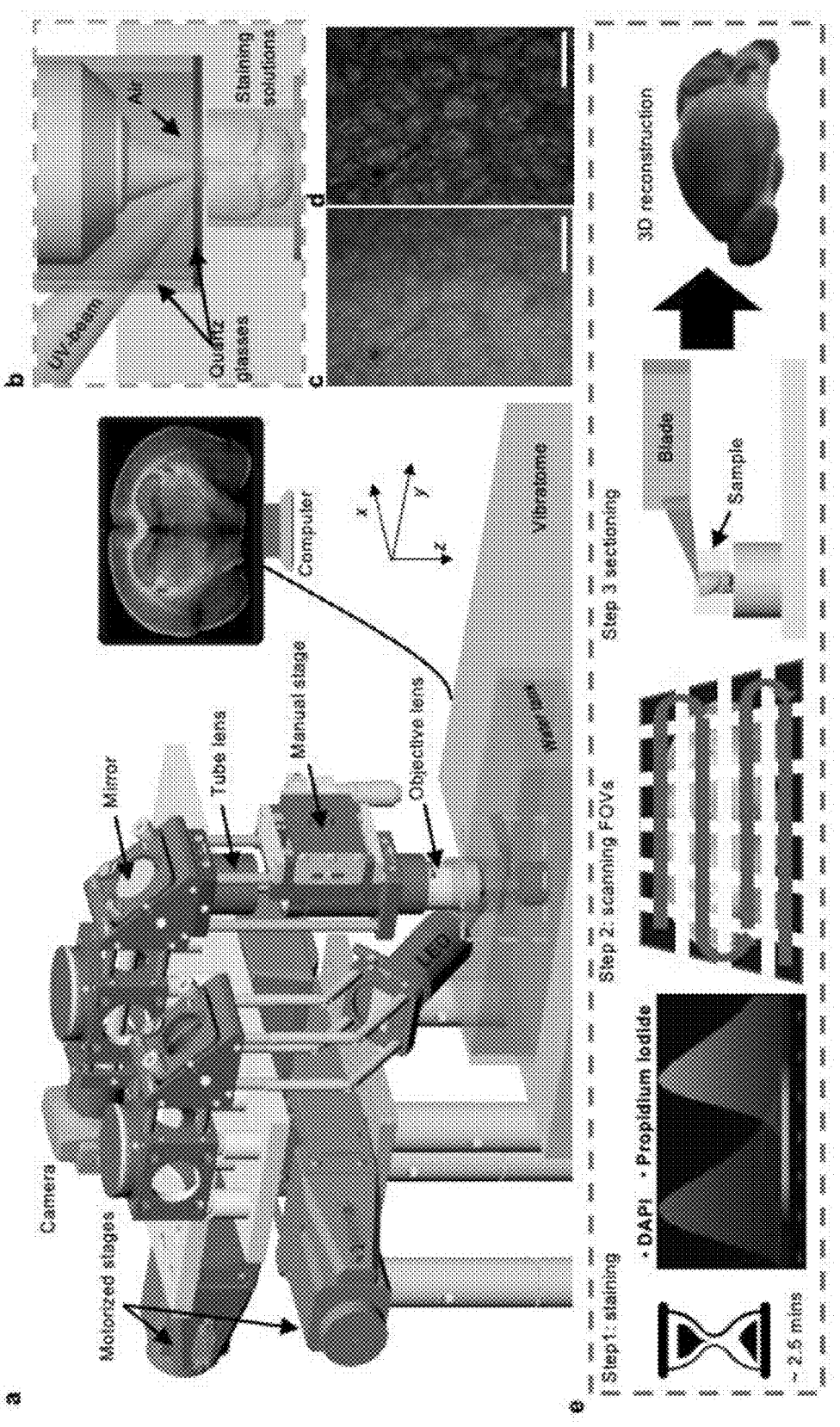
FIG. 1, including FIGS. 1a-1e, provides an overview of 3D imaging by TRUST (Scale bar: 100 μm), where.

The block-face imaging of the TRUST system is based on the short penetration depth of obliquely illuminated UV light. With serial sectioning by vibratome, 3D imaging for the whole sample can be realized. FIG. 1, including FIGS. 1a-e, collectively depict an overview of 3D imaging by TRUST (scale bars, 100 μm).

The schematic of the TRUST system is shown in FIG. 1a. The light from UV-LED is obliquely focused onto the surface of the agarose-embedded sample (e.g., a mouse brain) to generate fluorescence and autofluorescence signal, which will be later collected by an objective lens, refocused by an infinitely corrected tube lens, and finally detected by the color camera. Specifically, UV light from LED (M285L5, Thorlabs) will be firstly focused on the surface of the tissue sample by a pair of lenses (#67-270, Edmund Optics; LA4306-UV, Thorlabs Inc.) with an oblique orientation. Then the excited fluorescence and autofluorescence signal will be collected with a 10× objective lens (RMS10X, Olympus), reflected by a UV-enhanced aluminum mirror (PF10-03-F01, Thorlabs), and finally focused on the color camera (DS-Fi3, Nikon) by an infinity-corrected tube lens (ACA254-200-A, Thorlabs). The raster-scanning of the imaging system along the x-y plane is realized by two motor stages (L-509, Physik Instrument), and the manually tunable z-axis stage is used to focus the objective lens. The 3D-printed plastic waterproof case (FIG. 1b) can be used to keep most of the space between the objective lens and the sample's surface filled with air instead of staining solutions. Otherwise, unwanted fluorescence background from stains would be evident, reducing the imaging contrast as shown in FIG. 1c. Two pieces of quartz glasses mounted on the waterproof case are used to transmit UV light.

The workflow of the whole imaging system is shown in FIG. 1e, and it can be simplified as the loop of three steps. Firstly, the surface layer of the sample will be quickly labeled by the stains (e.g., DAPI and PI). Secondly, the top layer will be 2D raster-scanned by 2-axis motorized stages and acquired FOVs will be automatically stitched in parallel by custom-developed programs. Thirdly, the vibratome will remove the imaged surface layer, and the sample holder will move upwards at the same distance as the slicing thickness to keep the imaging in focus. To realize fully automatic 3D imaging, a driving system based on a MCU (Mega 2560, Arduino) has been developed to trigger and synchronize all hardware, including motorized stages, vibratome, and the camera.

Because the sample is stained along with the imaging in TRUST, the labeling protocol can be thought of as real-time staining. For demonstration, two fluorogenic probes, DAPI and PI, are used to stain nucleic acid in cells. The excited fluorescence signal of DAPI or PI exhibits an over 20-fold stronger fluorescence emission [21], [22] when they are bonded to nucleic acid, so the fluorescence background of tissue will not be too much even without washing. If necessary, one pump (not shown in FIG. 1) can be utilized to add additional dyes into the water tank of vibratome to maintain the concentration of chemical dyes stable for long-time imaging and staining.

B. Patterned-TRUST

Previously, the short penetration of UV light in tissue was utilized for block-face imaging. However, the transparency can vary with different tissue types, and sometimes the penetration depth can be over several tens of micrometers. Therefore, to better control axial resolution, we also proposed integrating optical sectioning methods into the TRUST system. More specifically, patterned illumination from HiLo microscopy was chosen for demonstration because of its simplicity and robustness.

B.1. Theoretical Background of HiLo Microscopy

Optical sectioning through HiLo microscopy has been reported in detail [1], [2]. HiLo requires two images to obtain one optically sectioned image. A uniform-illumination image ($I_u$) is used to acquire high-frequency (Hi) components, whereas a speckle-illumination image ($I_s$) is used to obtain low-frequency (Lo) components of the final image. The fusion of these two images will produce a full-resolution optically-sectioned image $I_{HiLo}$, which can be calculated as $$I_{HiLo}(\vec{r}) = I_{Hi}(\vec{r}) + \eta I_{Lo}(\vec{r}) \tag{1}$$

where: $I_{Hi}(\vec{r})$ and $I_{Lo}(\vec{r})$ are the intensity distributions of the high- and low-frequency images, respectively; $\vec{r}$ is the spatial coordinates; and $\eta$ is a scaling factor that ensures a seamless transition from low to high spatial frequencies, which can be determined experimentally.

It is well known that the intensity of higher frequency components attenuates much rapidly than lower frequency components with the increase of defocus. As a result, high-frequency components are imaged with high contrast only at the focal plane. Therefore, high-frequency components are naturally optically sectioned and they can be extracted from $I_u$ via a simple high-pass filtering $$I_{Hi}(\vec{r}) = \mathscr{F}^{-1}\{I_u(\vec{k})XHP(\vec{k})\} \tag{2}$$

where: $\mathscr{F}^{-1}(\bullet)$ stands for the inverse Fourier transform; $\vec{k}$ denotes the coordinates in the Fourier domain; and HP is a Gaussian high-pass filter with a cutoff frequency of $k_c$ in the Fourier domain.

The low-frequency components can be calculated with a complementary low-pass filter LP as $$I_{Lo}(\vec{r}) = \mathscr{F}^{-1}\{\mathscr{F}[C_s(\vec{r}) \cdot I_u(\vec{r})]XLP(\vec{k})\} \tag{3}$$

where: F($\bullet$) denotes the Fourier transform; and LP=1−HP. Here the speckle contrast $C_s(\vec{r})$ serves as a weighting function that decays with defocus, which enables to distinguish between in-focus from out-of-focus contributions in uniform-illumination images. To eliminate the variations induced by the object itself, the speckle contrast should be evaluated locally on the difference image, which is given by $I_\delta(\vec{r})=I_s(\vec{r})-I_u(\vec{r})$. Correct evaluation of the local speckle contrast is crucial to HiLo, and it can be calculated as $$C_s(\vec{r}) = \frac{sd_\Lambda[I_\delta(\vec{r})]}{\mu_\Lambda[I_s(\vec{r})]} \tag{4}$$

where $sd_\Lambda(\bullet)$ and $\mu_\Lambda(\bullet)$ represent the standard deviation and mean value calculated over a sliding window with a side length of $\Lambda$, which can be determined by $\Lambda=1/2k_c$ [23].

The decay efficiency of $C_s$ can be accelerated by applying an additional band-pass filter to the difference image prior to contrast evaluation. This band-pass filter can be generated by subtracting two Gaussian low-pass filters, which is calculated as $$W(\vec{k}) = \exp\left(-\frac{|k|^2}{2\sigma^2}\right) - \exp\left(-\frac{|k|^2}{\sigma^2}\right). \tag{5}$$

By setting $k_c$ to be approximately $0.18\sigma^2$, the axial resolution of HiLo can be controlled by only changing the parameter $\sigma$ (e.g., FIG. 5k). The numerical processing can be done in nearly real-time with a workstation with a Core i9-10980XE CPU @ 4.8 GHz and 8×32 GB RAM, and 4 NVIDIA GEFORCE RTX 3090 GPUs.

B.2. System Setup of the Patterned-TRUST System

Figure 2:
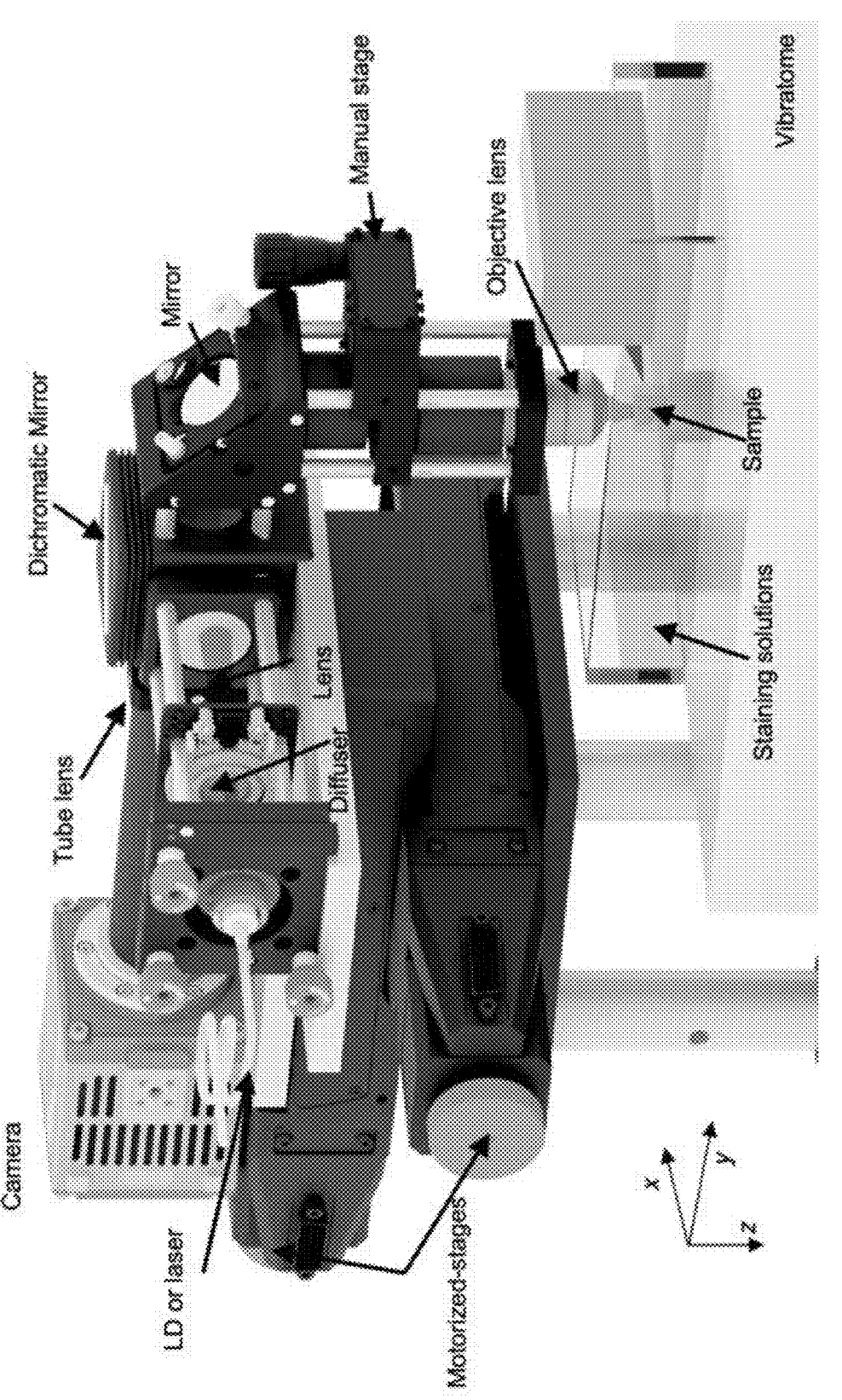
FIG. 2 depicts a schematic of the Patterned-TRUST system.

FIG. 2 depicts a schematic of the Patterned-TRUST system. As illustrated in FIG. 2, the light beam from the LD or laser firstly transmits through a diffuser plate, and the generated speckle will be collected by a lens, reflected by a dichromatic mirror and aluminum mirror, and finally projected on the sample by an objective lens. The excited signal on the sample's surface will be collected by the objective lens and finally focused on the camera by a tube lens. The waterproof case is still preferred though not plotted in FIG. 2 for simplicity.

The basic implementation of HiLo microscopy requires two shots for each FOV, one with patterned illumination and another with uniform illumination. The switching between two illumination statuses was realized by placing the diffuser plate on a motorized rotating mount (ELL14, Thorlabs) and controlling whether to spin it.

The generation of pattern illumination in Patterned-TRUST is not limited to the usage of the diffuser or coherent light sources (e.g., laser or LD). For example, gratings have also been widely used to realize sinusoidal illumination [24], [25]. The incoherent light source, like LED, can also be used to generate structured illumination with the help of a DMD [26]. Also, the combination of a laser and a spatial light modulator can generate grid or uniform illumination patterns [27].

Finally, besides patterned illumination, other optical sectioning methods, like light-sheet microscopy [28], can also be combined with TRUST to improve its axial resolution.

C. Imaging Results of the TRUST System

A mouse brain was firstly imaged to demonstrate the labor-free, high-speed, and high-content imaging capability of TRUST. After agarose embedding, the fixed whole mouse brain can be directly imaged by TRUST with ~35 hours. For comparison, whole-brain staining or clearing itself in conventional fluorescence microscopies will already take weeks [5], [7], [16].

Figure 3:
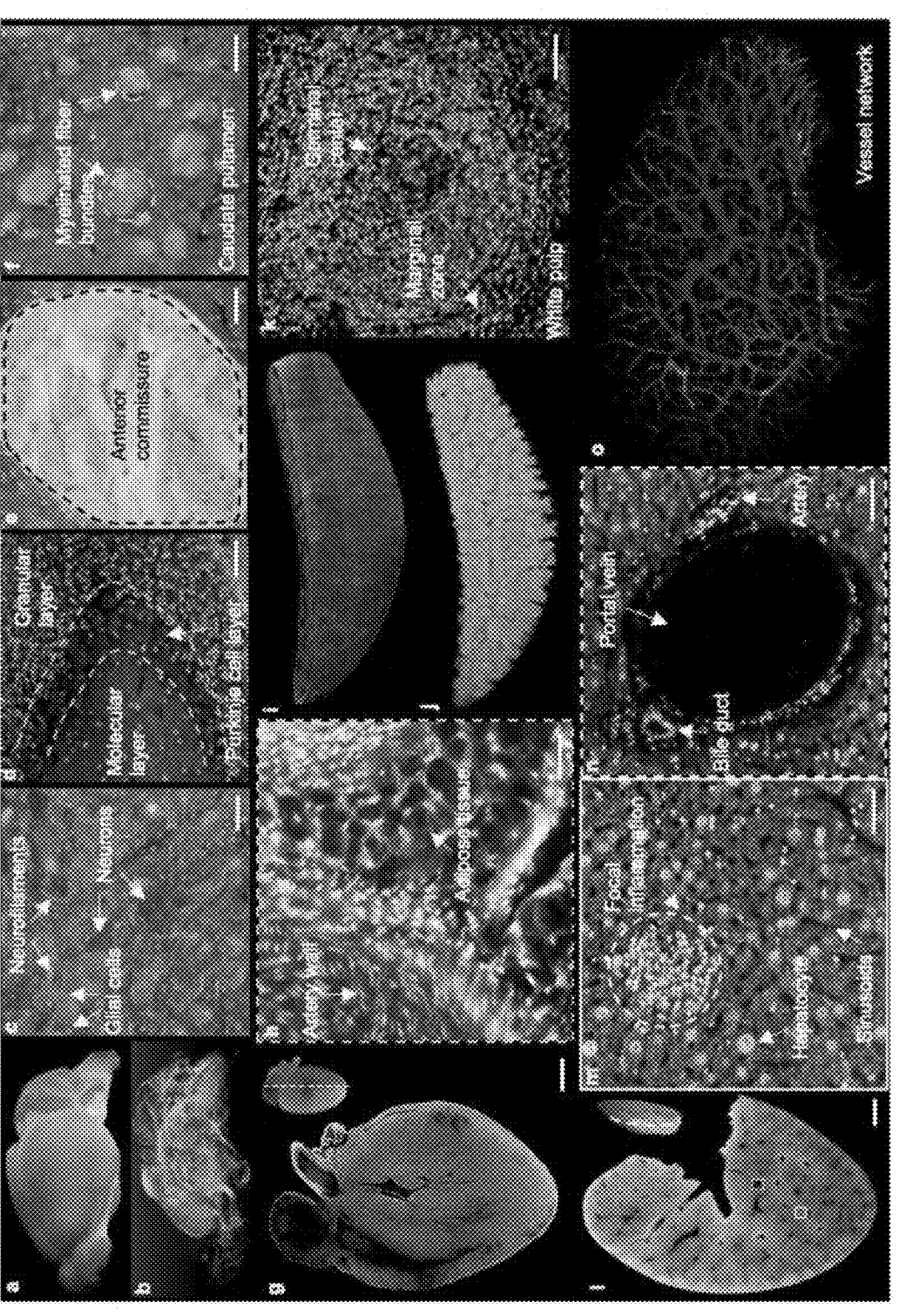
FIG. 3, including FIGS. 3a-3o, provides imaging results of the TRUST system, with scale bars of 1 mm (FIGS. 3g and 3l) and 50 μm (FIGS. 3c-3f, 3h, 3k, 3m, and 3n), where.

FIG. 3, including FIGS. 3a-3o, provides imaging results of the TRUST system, with scale bars of 1 mm (FIGS. 3g and 3l) and 50 μm (FIGS. 3c-3f, 3h, 3k, 3m, and 3n).

Without the need for image registration, ~350 coronal slices of the whole brain with a sectioning thickness of 50 μm can be directly stacked to reconstruct its 3D model (FIG. 3a). To demonstrate the universal and robust imaging performance of TRUST, other organs in mice with various tissue types and volume size, like heart (FIG. 3g-3h), spleen (FIG. 3i-3k), and liver (FIG. 3l-3o), have also been imaged with TRUST.

TRUST can realize multi-channel imaging, and biological information of TRUST images is extremely abundant, as shown as follows.

Autofluorescence signals from endogenous fluorophores can be excited by UV light. For example, neurofilaments (FIG. 3c), myelinated fiber bundles (FIG. 3f), and adipose tissue (FIG. 3h) have been clearly visualized with TRUST even without any labeling.

Due to the usage of a color camera, the color and lightness information can be captured and utilized to extract and differentiate 3D structures of different tissue components. For example, the 3D structure of nerve tracts or fibers in the whole brain (FIG. 3b) can be extracted from the green channel of color images. Blood vessels of the liver, as shown in FIG. 3o can also be segmented because the signal of blood vessels is much lower than the surrounding tissue.

Labelling tissue components with fluorescent dyes with different emission spectra and capturing with the color camera, TRUST can achieve multicolor molecular imaging and reveal more biological information with high specificity. For demonstration, the double labeling with DAPI & PI helps reveal more biological information. Firstly, as shown in FIG. 3c, PI staining can clearly reveal cytomorphological details of neurons in the brain while cell bodies of glial cells are only slightly labelled [29]. Thus, it can be used to differentiate neurons from glial cells through morphological differences. Secondly, combining two stains can highlight some biological structures, like the Purkinje cell layer, as shown in FIG. 3d. At last, the mixed dyes with a broad emission spectrum (blue to red) make the fluorescence signal less affected by the autofluorescence background. For example, although hepatocytes in liver tissue (e.g., FIG. 3m) are hard to be differentiated from the autofluorescence background in the red channel, the image contrast is still acceptable in the green or blue channel.

D. Imaging Results of the Patterned-TRUST System

Figure 4:
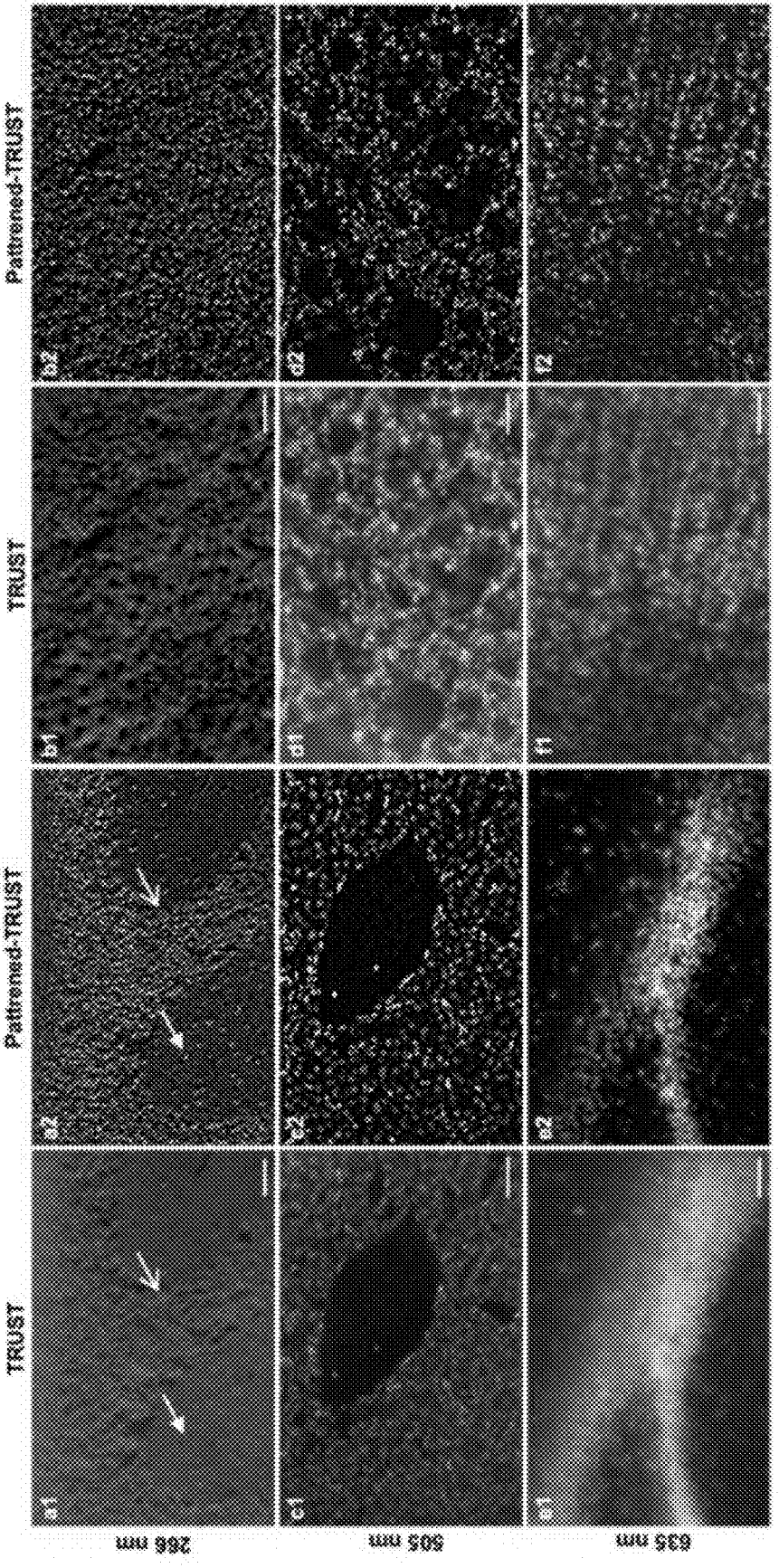
FIG. 4, including

FIG. 4, including FIGS. 4a1-f2, depicts imaging results of the Patterned-TRUST system (Scale bars: 50 μm).

First, the performance of the Patterned-TRUST system is demonstrated by imaging a mouse brain with a 266 nm UV-laser as shown in FIG. 4a1-4b2. Two chemical dyes (DAPI & PI) were used for cell nucleus staining, and a color camera was used to capture the excited signal. Compared with results from the original TRUST system (FIG. 4a1, 4b1), the reconstructed images from the Patterned-TRUST system (FIGS. 4a2 and 4b2) demonstrate higher imaging contrast due to the improved optical sectioning ability.

Compared with the TRUST system, the performance of the Patterned-TRUST system is almost not affected by the wavelength of the excitation light source or the transparency of imaged samples. Therefore, the light source with a longer wavelength can also be applied in the Patterned-TRUST system as the excitation source. For example, fixed mouse kidney and lung stained with AO have been imaged with 505 nm LD as the light source and captured by a gray-scale camera (FIG. 4c1-4d2). The obvious out-of-focus background is due to the longer excitation wavelength and porous structures, as shown in FIG. 4cl and FIG. 4d1. The unwanted background can be rejected in the Patterned-TRUST system because of the improved optical sectioning ability (FIG. 4c2 and FIG. 4d2). Finally, the fresh mouse brain has also been successfully imaged by Patterned-TRUST with 635 nm LD, as shown in FIG. 4e2 and FIG. 4f2.

D.1. Axial Resolution Measurement

Fluorescent beads with a diameter far below the resolution limit of a microscope are commonly used to experimentally determine the system's axial resolution. However, this will collide with the filtering process in HiLo microscopy, which achieves optical sectioning by evaluating the speckle contrast over a sampling window containing several imaged grains. Alternatively, we quantify HiLo's axial resolution by imaging 10 μm-diameter fluorescent microspheres [30], and the resulting axial resolution can be calculated as $$FWHM_{HiLo} = \sqrt{FWHM_{measured}^2 - d_{bead}^2} \qquad (6)$$

where: $FWHM_{measured}$ is the FWHM of the measured optical sectioning curve; and $d_{bead}$ is the diameter of fluorescent microspheres, which is 10 μm according to the manufacturer. The specimen is axially scanned over a total range of 50 μm with a step of 0.5 μm.

Figure 5:
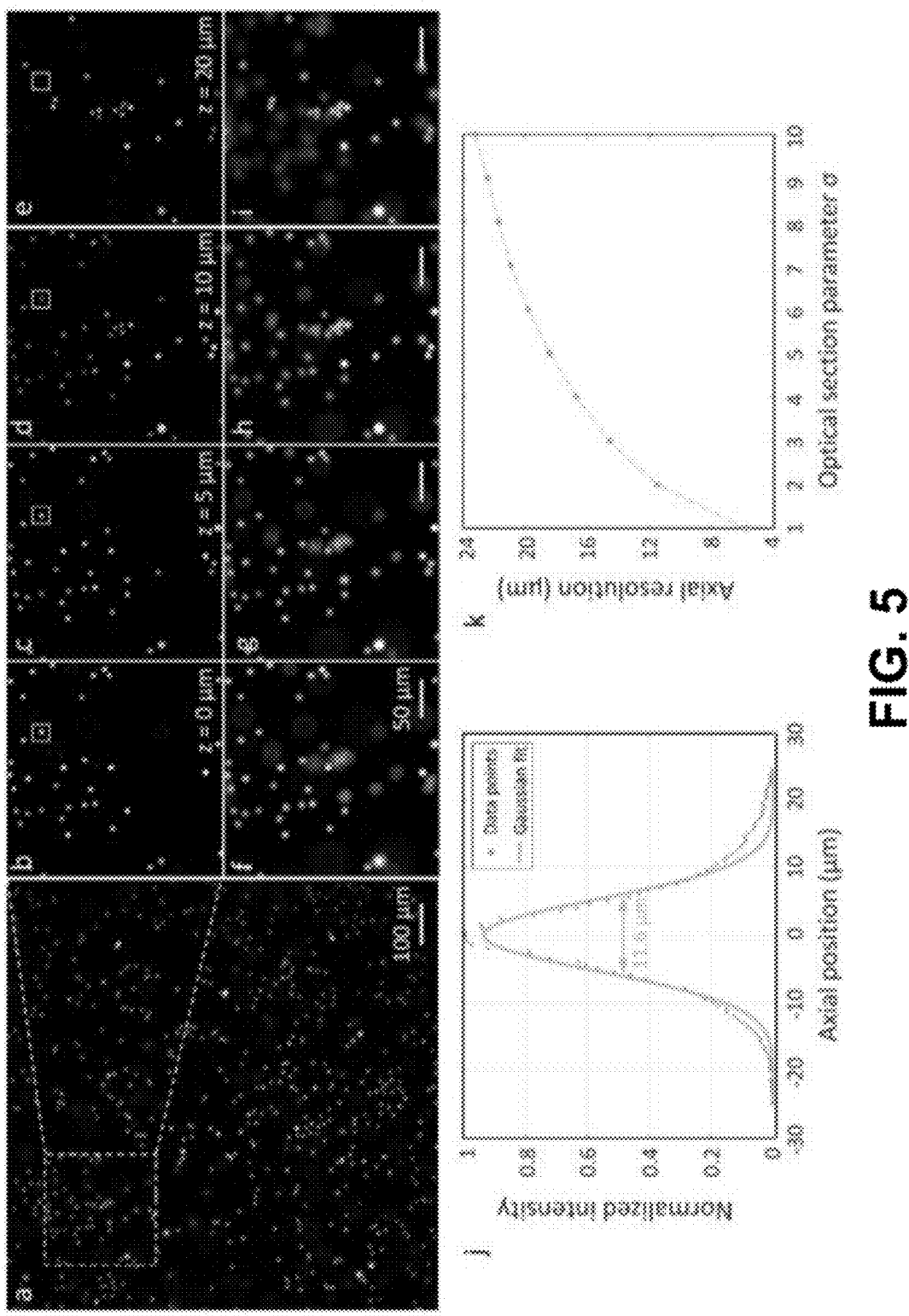
FIG. 5, including FIGS. 5a-5k, provides the experimental characterization of HiLo's axial resolution, where.

FIG. 5, including FIGS. 5a-5k, collectively provides experimental characterization of HiLo's axial resolution. FIG. 5a depicts a maximum-intensity projection of the HiLo images of 10 μm-diameter fluorescent microspheres. The HiLo images (FIG. 5b-5e) and wide-field images (FIG. 5f-5i) at different axial scanning depths are compared in FIG. 5. The curve of the axial intensity distribution of a selected fluorescent microsphere (indicated by the solid box in FIG. 5b-5e) is shown in FIG. 5j, with a measured FWHM of 11.6 μm, corresponding to an axial resolution of 5.8 μm, which is competent to produce an optical section in lieu of a physical section in slide-based FFPE histology. In addition, different sectioning capabilities can be obtained from the same raw dataset by adjusting an optical section parameter σ during numerical processing [2] (FIG. 5k), which is the unique feature of HiLo microscopy. In FIG. 5k, the experiment was performed with a 10×/0.3 NA objective at 532 nm excitation wavelength and 560 nm fluorescent emission wavelength.

E. Deep-TRUST

E.1. Improvement of Scanning Speed and Lateral Resolution

The imaging of the TRUST system is fast because of its wide field scanning configuration and real-time staining. However, when compared with light-sheet microscopy, the optical scanning speed of TRUST is still relatively low. With a lower magnification objective lens, the scanning speed can be improved significantly because of a larger FOV. However, diffraction-limited optical resolution of the objective lens will also decrease because of the smaller NA. Therefore, we proposed integrating a SR neural network (e.g., ESRGAN [4]) into the original TRUST system to recover the deteriorated imaging resolution.

Figure 6:
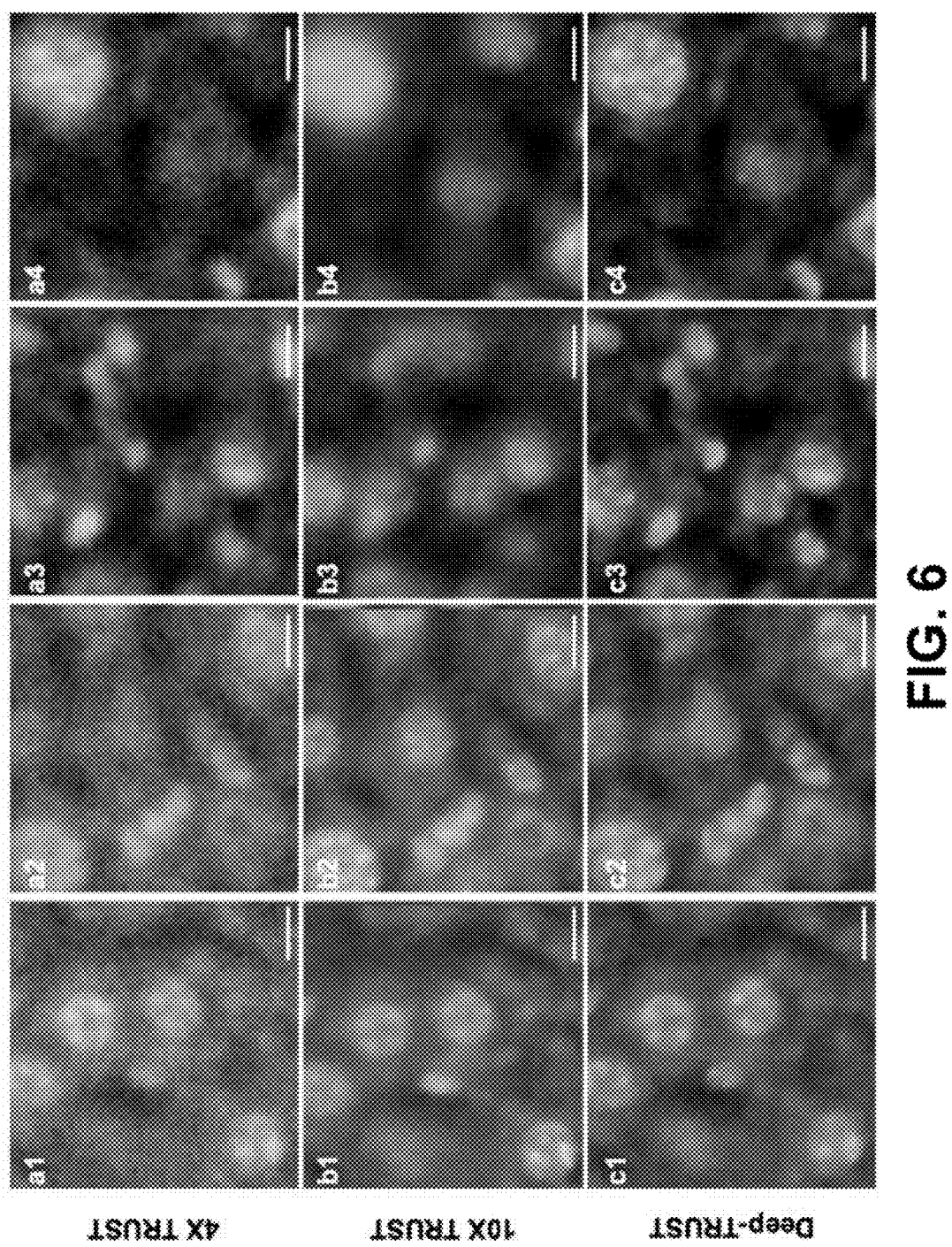
FIG. 6, including FIGS. 6a1-6c4, collectively provides a comparison of imaging results from 4× TRUST, 10× TRUST, and Deep-TRUST (Scale bars: 10 μm), where.

Preliminary results are shown in FIG. 6. Specifically, FIGS. 6a1-c4 collectively provide a comparison of imaging results from 4× TRUST, 10× TRUST, and Deep-TRUST (Scale bars: 10 μm). The top row (4× TRUST) and the second row (10× TRUST) were acquired by the TRUST system with a 4× objective lens (0.1 NA) and 10× objective lens (0.3 NA). The final row (Deep-TRUST) was the output of the trained ESRGAN network with the first row as input. Deep-TRUST images in the first two columns (FIGS. 6c1-6c2) exhibited obvious resolution improvement when compared with 4× TRUST (FIGS. 6a1-6a2) and look very similar to those from the 10× TRUST system (FIGS. 6b1-6b2). More importantly, when images become completely blurry in the 10× TRUST system (FIGS. 6b3-6b4) due to the unevenness of the sample surface, images in the Deep-TRUST system (FIGS. 6c3-6c4) can still be sharp and clear because of the larger depth of field of 4× objective lens.

E.2. Virtual Optical Sectioning by Deep Learning

Figure 7:
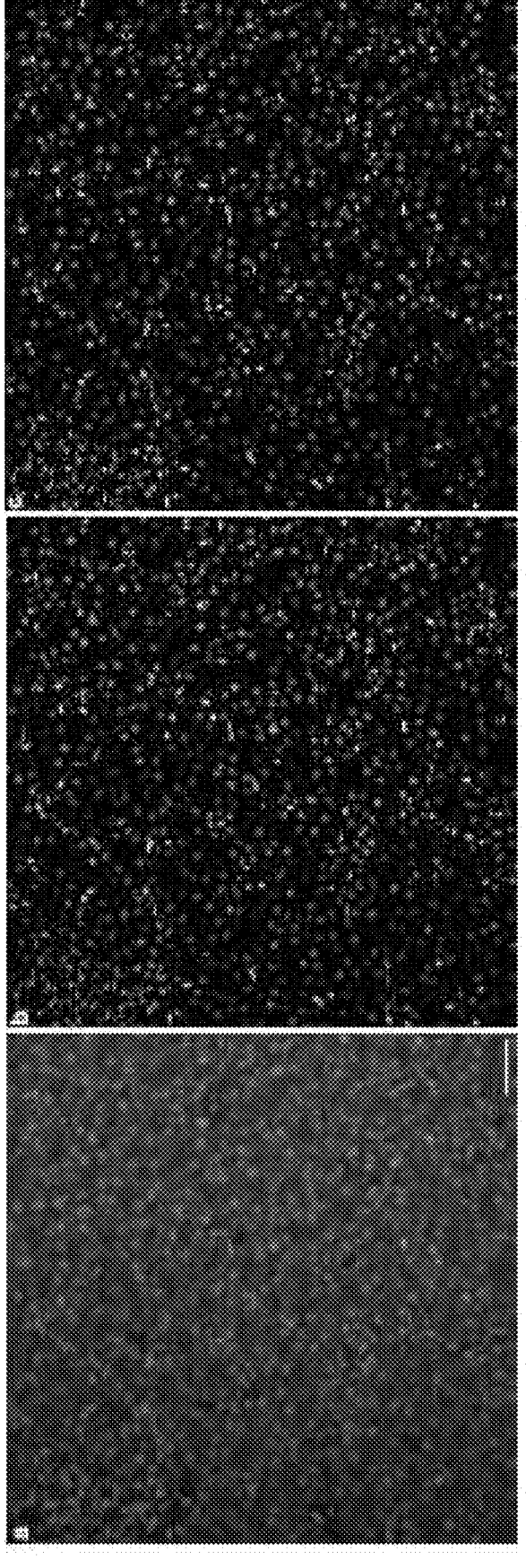
FIG. 7, including FIGS. 7a-7c, provides a demonstration of the effectiveness of the virtual optical sectioning ability of the Pix2Pix network (Scale bar: 50 μm), where.
Figure 8:
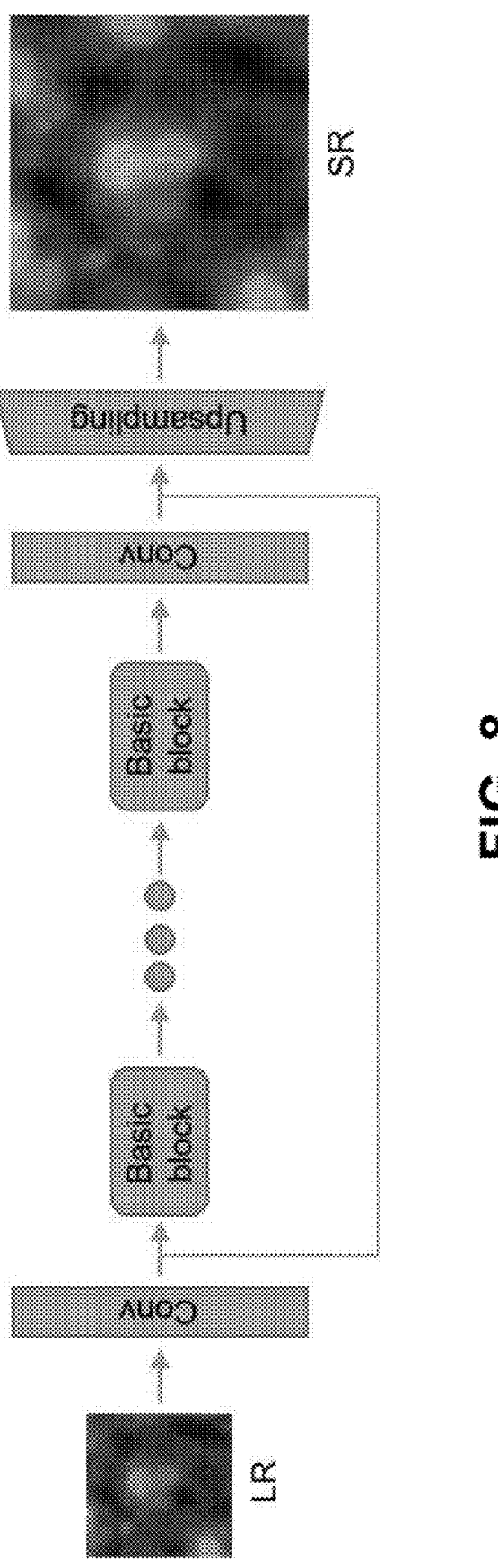
FIG. 8 provides a demonstration of the CNN of ESRGAN to generate super-resolution TRUST images.

As mentioned above, Patterned-TRUST can achieve a higher axial resolution, and its performance is almost not affected by the tissue type or the wavelength of the excitation light source. However, at least two shots are required for each FOV which significantly increases the time cost. To this end, a deep learning network (e.g., Pix2Pix [3]) can be used to directly realize virtual optical sectioning without additional speckle illumination. FIG. 7 demonstrates the effectiveness of the network. As shown in FIG. 7, we compare imaging results from the original TRUST system (FIG. 7a), the Patterned-TRUST system (FIG. 7b), and the virtually sectioned TRUST image (FIG. 7c).

E.3. Sample Preparation

Once mice (C57BL/6) were sacrificed, organs or embryos inside should be harvested immediately and rinsed by PBS solution for a minute. Then they will be submerged under 10% NBF at room temperature for 24 hours for fixation. To achieve better sectioning quality, it is common to embed tissue samples into 2%~3% (w/v) agarose.

E.4. ESRGAN Network

Firstly, we integrated the super-resolution neural network into our TRUST system to transfer LR TRUST images acquired with a 4× objective lens to HR TRUST images obtained with a 10× objective lens. SR networks can be SRGAN [31], ESRGAN [4], CAR [32], or other SR deep learning methods. Here, ESRGAN is adopted by us. By training the ESRGAN neural network with paired LR TRUST images and HR TRUST images, the well-trained ESRGAN network can transform the inputted LR TRUST image obtained with a 4× objective lens into a SR TRUST image which is comparable with the HR TRUST image acquired with 10× objective. Here, we use the dense block [33] as the "basic block". The inputted LR TRUST image goes through the convolutional layer, 13 dense blocks and the up-sampling convolutional layer, and is finally transformed into a SR TRUST image.

E.5. Pix2Pix Network

Next, we used the cGAN to generate a virtual Patterned-TRUST image from the original TRUST image. Here we adopted the cGAN from Pix2pix [3]. By training the Pix2pix network with paired TRUST images and Patterned-TRUST images, the Pix2pix network can learn to generate virtual Patterned TRUST images from original TRUST images, as shown in FIG. 9.

Figure 9:
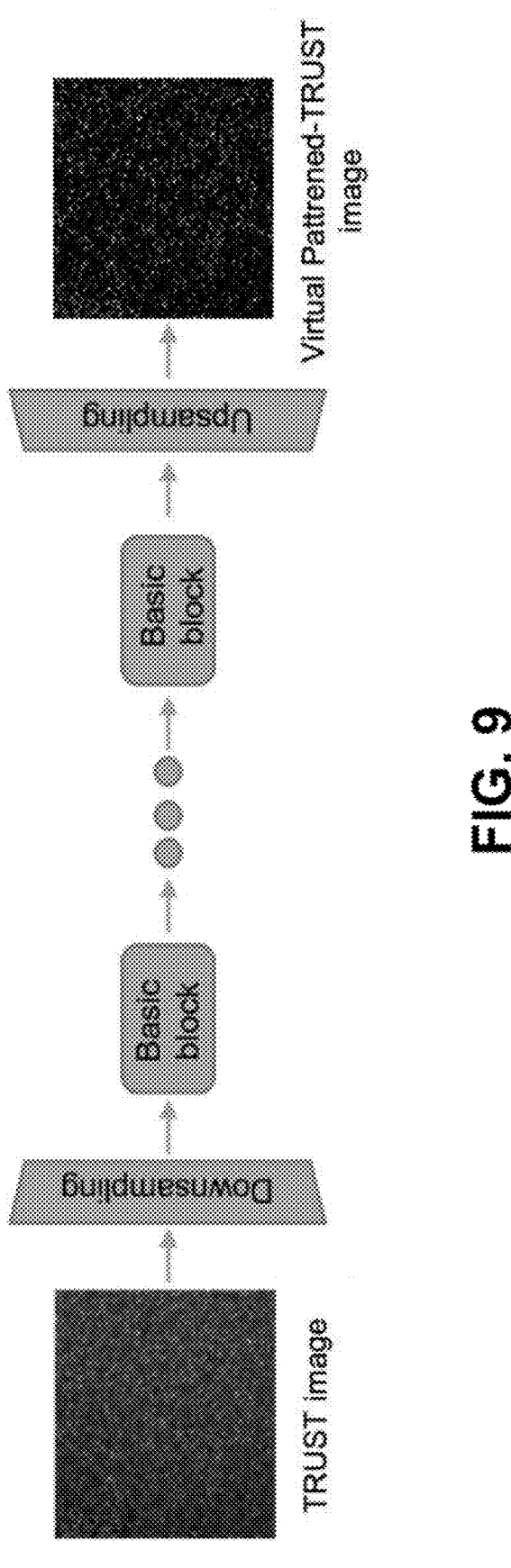
FIG. 9 provides a demonstration of the CNN of Pix2pix that can generate virtual Patterned TRUST images.

FIG. 9 demonstrates the simplified structure of Pix2pix that can generate virtual Patterned TRUST images. Here, we use the residual block [34] as the "basic block". The inputted TRUST image goes through the down-sampling convolutional layer, several residual blocks, and the up-sampling layer, and is then transferred to a virtual Patterned TRUST image.

E.6. Neural Network Implementation

The neural network was implemented using Python version 3.7.3, with Pytorch version 1.0.1. The software was implemented on a desktop computer with a Core i7-8700K CPU @ 3.7 GHz and 32 GB of RAM, running an Ubuntu 18.04.2 LTS operation system. The training and testing of the neural networks were performed using GeForce GTX 1080Ti GPUs with 11 GB RAM.

F. Details of Embodiments of the Present Invention

The present invention is developed based on the details of TRUST, Patterned-TRUST, and Deep-TRUST, as disclosed above.

As used herein, "a 3D image volume" of a sample is a sequence of 2D images where the 2D images are cross-sectional images of the sample imaged at locations along a certain axis perpendicular to each 2D image such that the sequence of 2D images forms a 3D image of the sample in cross-section.

The first aspect of the present invention is to provide the first method for tomographically imaging a sample with UV excitation to yield a 3D fluorescence image volume. The first method is used for a Deep-TRUST system and is related to imaging the sample to obtain a LR TRUST image and then transferring it to a HR TRUST image with a SR neural network, thereby reducing the image scanning time.

Figure 10:
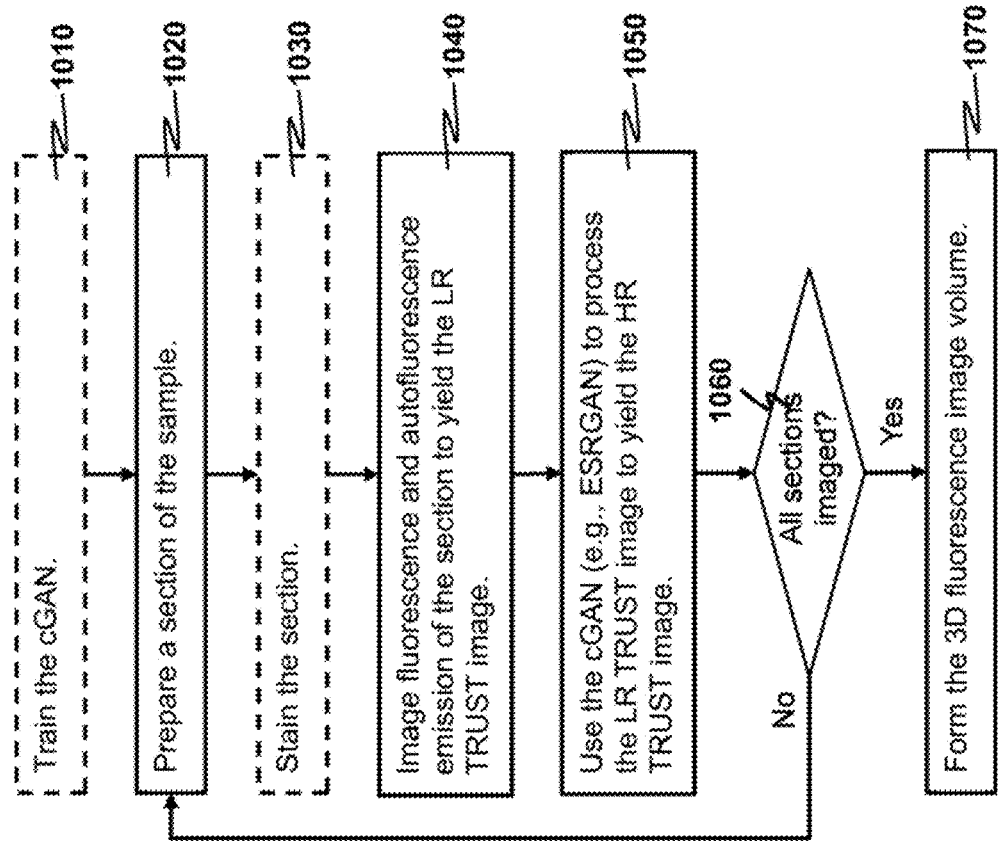
FIG. 10 depicts a flowchart showing exemplary steps in the first method for tomographically imaging a sample with UV excitation to yield a 3D fluorescence image volume as disclosed herein.

FIG. 10 depicts a flowchart showing exemplary steps in the disclosed first method.

In step 1020, a section of the sample is prepared for imaging. By repeating the step 1020 for plural times, a plurality of sections of the sample for imaging is prepared. Typically, each section is an exposed surface of the sample, and the plurality of sections is prepared by serially sectioning the sample.

In step 1040, the LR TRUST image of an individual section of the sample irradiated with UV light is acquired with a low-magnification objective lens. The image resolution of the LR TRUST image is relatively low compared with the output HR TRUST image from the SR neural network.

The step 1040 may be carried out by dividing the individual section into a plurality of FOVs. Then all FOVs are raster-scanned one by one to generate the LR TRUST image after image stitching.

Preferably, the step 1040 is preceded by a step 1030 for staining the individual section with one or more types of fluorescent dyes. As a result, better color contrast is achieved, and more biological information is revealed. Fluorogenic probes (e.g., DAPI and PI) are preferred, which show increased fluorescence intensity upon target binding. The fluorogenic effect can substantially improve the signal-to-background ratio.

After the LR TRUST image is obtained in step 1040, a cGAN is used in step 1050 to transfer the LR TRUST image into the HR TRUST image. Advantageously, the SR neural network reduces the image scanning time compared to directly obtaining the HR TRUST image.

The cGAN may be selected to be a SRGAN, an ESR-GAN, a CAR, or another SR deep learning network.

The steps 1020, 1030 (if implemented), 1040 and 1050 are repeated until all respective sections of the sample are processed (step 1060).

After the respective sections are imaged, in step 1070, all HR TRUST images are collected to form the 3D fluorescence image volume.

The step 1040 is executed after the cGAN is trained. Optionally, the cGAN is trained with a training dataset at a startup stage, e.g., in step 1010. The training dataset comprises a plurality of training samples. An individual training sample comprises a paired example of the LR TRUST image and the HR TRUST image.

As used herein, "an example of an object", in which the object can take on different forms, values or contents within the definition of the object, is an instance of the object. For example, if the object is multi-valued or can be realized into different realizations, an example of the object may be one value of the object, or one realization of the object. As used herein, "a paired example of Object A and Object B" is a pair composed of a first example of Object A and a second example of Object B, where Object A and Object B are related (not independent to each other), and the second example is determined according to the first example.

The second aspect of the present invention is to provide the second method for tomographically imaging a sample with UV excitation to yield a 3D fluorescence image volume. The second method, which is also used for a Deep-TRUST system, uses a deep-learning neural network to realize virtual optical sectioning by generating a virtual Patterned-TRUST image from an original ordinary TRUST image without a need to acquire multiple TRUST images imaged under different illumination conditions of UV light, thereby reducing the imaging time.

Figure 11:
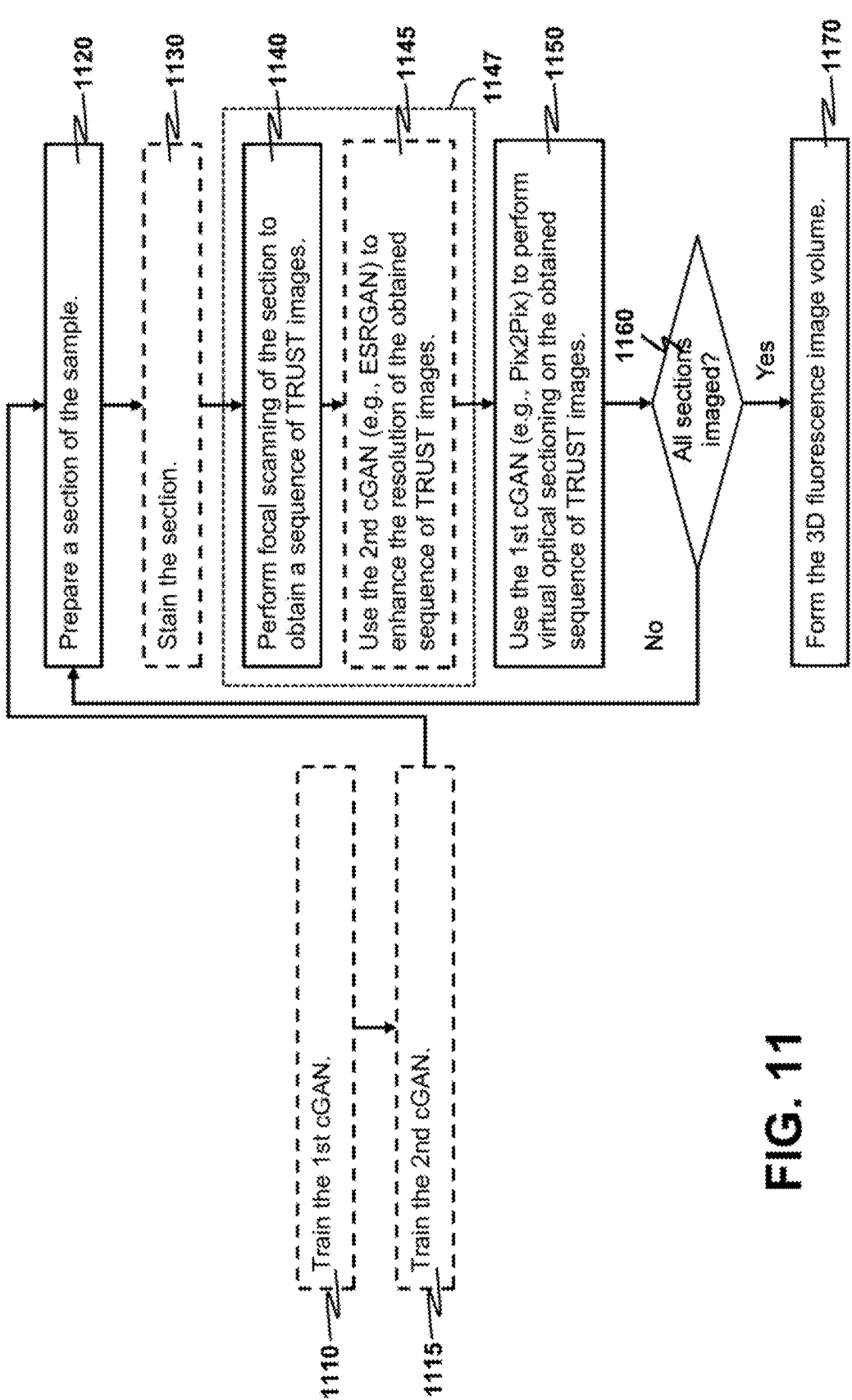
FIG. 11 depicts a flowchart showing exemplary steps in a second method for tomographically imaging a sample with UV excitation to yield a 3D fluorescence image volume as disclosed herein.

FIG. 11 depicts a flowchart showing exemplary steps used in the disclosed second method.

In step 1120, a section of the sample is prepared for imaging. By repeating the step 1120 for plural times, a plurality of sections of the sample for imaging is prepared. Typically, each section is an exposed surface of the sample, and the plurality of sections is prepared by serially sectioning the sample.

In step 1140, a sequence of TRUST images that record fluorescence and autofluorescence emission of the individual section is obtained by translating the imaging device and/or tissue sample step by step within the focal scanning range. Typically, the value of the focal scanning range is the minimum between the UV light penetration depth and the mechanical sectioning thickness. The moving stepsize when acquiring the sequence of TRUST images is preferably half the optical sectioning thickness.

The step 1147 includes the step 1140. If implemented, step 1145 will enhance the lateral resolution of the ordinary sequence of TRUST images acquired in step 1140.

Preferably, the step 1140 is preceded by a step 1130 of staining the individual section with one or more types of fluorescent dyes in the staining solutions. As a result, better color contrast is achieved, and more biological information is revealed. Fluorogenic probes (e.g., DAPI and PI) are preferred, which show increased fluorescence upon target binding. The fluorogenic effect can substantially improve the signal-to-background ratio.

After a sequence of TRUST images is obtained in step 1147 by focal scanning, the first cGAN is used in step 1150 to process TRUST images into virtual optically-sectioned TRUST images. The first cGAN is configured and trained to predict the virtual optically-sectioned image with a single ordinary TRUST image obtained under the uniform-illumination condition, thereby reducing the time cost compared with HiLo microscopy;

The first cGAN may be selected to be Pix2Pix.

The steps 1120, 1130 (if implemented), 1147 and 1150 are repeated until all respective sections of the sample are processed (step 1160).

After the respective sections are imaged, respective sequences of virtual optically-sectioned fluorescence images for the plurality of sections are obtained. In step 1170, the respective sequences of virtually optically-sectioned TRUST images are collected to form the 3D fluorescence image volume.

In the first option of step 1147, the TRUST image sequence is directly obtained from step 1140 under the uniform-illumination condition. In the second option of step 1147, step 1145 is also implemented to further enhance the resolution of the ordinary TRUST image sequence with a SR neural network (e.g., ESRGAN).

In step 1140, the fluorescence and autofluorescence emission of the individual section is imaged to yield the TRUST image sequence when the individual section is irradiated with UV under the uniform-illumination condition.

In step 1145, the second cGAN is implemented to further enhance the resolution of the input TRUST image sequence with a SR neural network (e.g., ESRGAN). As a result, the second cGAN reduces the image scanning time compared to directly obtaining the TRUST image sequence with the same image resolution.

The second cGAN may be selected as SRGAN, ESR-GAN, CAR, or another SR deep learning network.

Regardless of whether the first or second option is used in step 1147, step 1140 may be carried out by performing focal scanning of the individual section to obtain a sequence of TRUST images. In certain embodiments, each image in the TRUST image stack is obtained by dividing the individual section into a plurality of FOVs, sequentially imaging all FOVs with raster scanning, and finally stitching all FOVs as imaged.

The step 1150 is executed after the first cGAN is trained. Optionally, the first cGAN is trained with a first training dataset at a startup stage, e.g., in step 1110. The first training dataset comprises a plurality of first training samples. An individual first training sample comprises a paired example of the ordinary TRUST image acquired under uniform illumination and a corresponding Patterned-TRUST image.

Similarly, the step 1045 is executed after the second cGAN is trained. Optionally, the second cGAN is trained with a second training dataset at the startup stage, e.g., in step 1115. The second training dataset comprises a plurality of second training samples. An individual second training sample comprises a paired example of the LR TRUST image and the HR TRUST image.

A third aspect of the present invention is to provide a system for tomographically imaging a sample with UV excitation to yield a 3D fluorescence image volume, where the system implements any of the embodiments of the first and second methods as disclosed above. The disclosed system is a Deep-TRUST system.

Figure 12:
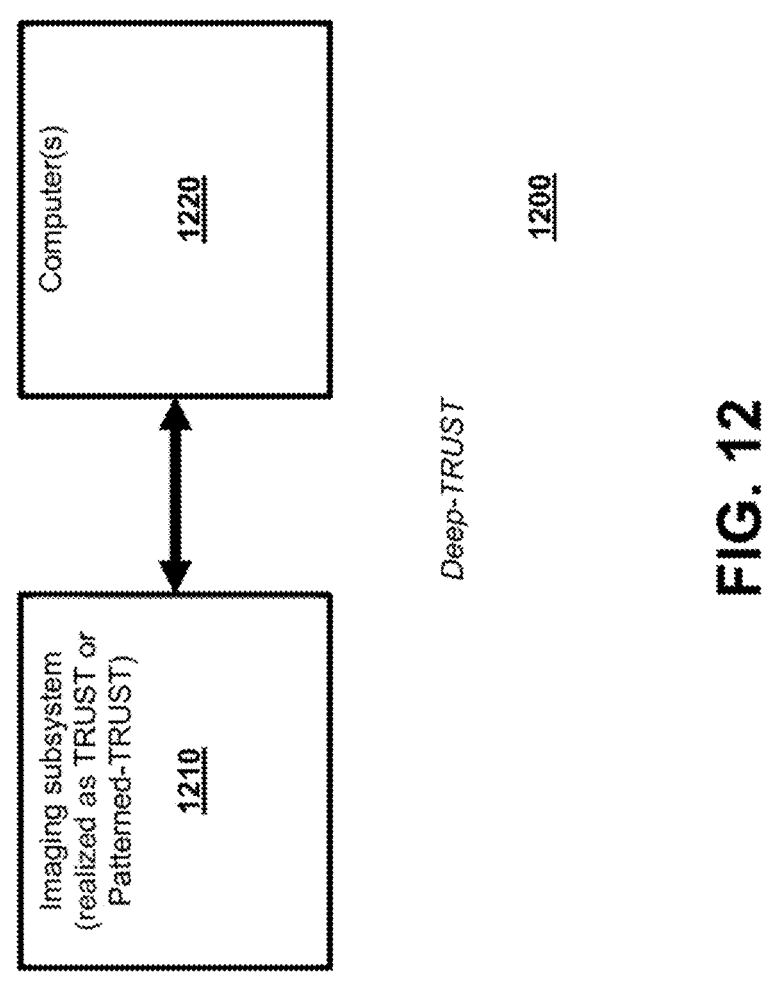
FIG. 12 depicts a schematic diagram of a Deep-TRUST system for realizing the first method of FIG. 10 or the second method of FIG. 11 in accordance with an exemplary embodiment of the disclosed system.

FIG. 12 depicts a schematic diagram of a Deep-TRUST system 1200 in accordance with an exemplary embodiment of the disclosed system. The Deep-TRUST system 1200 comprises an imaging subsystem 1210 and one or more computers 1220. The imaging subsystem 1210 is realized as a TRUST system or a Patterned-TRUST system as disclosed above, and is used for imaging the sample with UV excitation. One or more computers 1220 are used for controlling the imaging subsystem 1210 and determining the 3D fluorescence image volume.

If the Deep-TRUST system 1200 is used for implementing the disclosed first method, one or more computers 1220 may be configured to perform the steps 1010, 1050, 1060 and 1070, and to control the imaging subsystem 1210 to perform the steps 1020, 1030 and 1040.

If the Deep-TRUST system 1200 is used for implementing the disclosed second method, one or more computers 1220 may be configured to perform the steps 1110, 1115,

1145, 1150 and 1170, and to control the imaging subsystem 1210 to perform the steps 1120, 1130 and 1140.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

REFERENCES

There follows a list of references that are occasionally cited in the specification. Each of the disclosures of these references is incorporated by reference herein in its entirety.

[1] Lim, D., Chu, K. K. & Mertz, J. Wide-field fluorescence sectioning with hybrid speckle and uniform-illumination microscopy. *Opt. Lett.* 33, 1819 (2008).

[2] Lim, D., Ford, T. N., Chu, K. K. & Mertz, J. Optically sectioned in vivo imaging with speckle illumination HiLo microscopy. *J. Biomed. Opt.* 16, 016014 (2011).

[3] Isola, P., Zhu, J.-Y., Zhou, T., Efros, A. A. & Research, B. A. *Image-to-Image Translation with Conditional Adversarial Networks*.

[4] Wang, X. et al. ESRGAN: Enhanced super-resolution generative adversarial networks. *Lect. Notes Comput. Sci. (including Subser. Lect. Notes Artif. Intell. Lect. Notes Bioinformatics)* 11133 LNCS, 63-79 (2019).

[5] Seiriki, K. et al. Whole-brain block-face serial microscopy tomography at subcellular resolution using FAST. *Nat. Protoc.* (2019) doi:10.1038/s41596-019-0148-4.

[6] Seiriki, K. et al. High-Speed and Scalable Whole-Brain Imaging in Rodents and Primates. *Neuron* 94, 1085-1100. e6 (2017).

[7] Susaki, E. A. et al. Whole-brain imaging with single-cell resolution using chemical cocktails and computational analysis. *Cell* (2014) doi:10.1016/j.cell.2014.03.042.

[8] Tomer, R., Ye, L., Hsueh, B. & Deisseroth, K. Advanced CLARITY for rapid and high-resolution imaging of intact tissues. *Nat. Protoc.* (2014) doi:10.1038/nprot.2014.123.

[9] Wan, P. et al. Evaluation of seven optical clearing methods in mouse brain. *Neurophotonics* 5, 1 (2018).

[10] Molbay, M., Kolabas, Z. I., Todorov, M. I., Ohn, T.-L. & Ertürk, A. A guidebook for DISCO tissue clearing. *Mol. Syst. Biol.* 17, e9807-e9807 (2021).

[11] Gong, H. et al. ARTICLE High-throughput dual-colour precision imaging for brain-wide connectome with cyto-architectonic landmarks at the cellular level. *Nat. Commun.* (2016) doi:10.1038/ncomms12142.

[12] Li, A. et al. Micro-optical sectioning tomography to obtain a high-resolution atlas of the mouse brain. *Science* (80-.). 330, 1404-1408 (2010).

[13] Guo, J., Artur, C., Eriksen, J. L. & Mayerich, D. Three-Dimensional Microscopy by Milling with Ultraviolet Excitation. *Sci. Rep.* 9, (2019).

[14] Jud, C. et al. Dentinal tubules revealed with X-ray tensor tomography. *Dent. Mater.* 32, 1189-1195 (2016).

[15] Naveh, G. R. S., Brumfeld, V., Dean, M., Shahar, R. & Weiner, S. Direct microCT imaging of non-mineralized connective tissues at high resolution. *Connect. Tissue Res.* 55, 52-60 (2014).

[16] Susaki, E. A. et al. Advanced CUBIC protocols for whole-brain and whole-body clearing and imaging. *Nat. Protoc.* (2015) doi:10.1038/nprot.2015.085.

[17] Wong, T. T. W. et al. Label-free automated three-dimensional imaging of whole organs by microtomy-assisted photoacoustic microscopy. *Nat. Commun.* 8, 1386 (2017).

[18] Fereidouni, F. et al. Microscopy with ultraviolet surface excitation for rapid slide-free histology. *Nat. Biomed. Eng.* 1, 957-966 (2017).

[19] Yoshitake, T. et al. Rapid histopathological imaging of skin and breast cancer surgical specimens using immersion microscopy with ultraviolet surface excitation. *Sci. Rep.* 8, (2018).

[20] Lim, D., Ford, T. N., Chu, K. K. & Mertz, J. Optically sectioned in vivo imaging with speckle illumination HiLo microscopy. *J. Biomed. Opt.* 16, 016014 (2011).

[21] Barcellona, M. L., Cardiel, G. & Gratton, E. Time-resolved fluorescence of DAPI in solution and bound to polydeoxynucleotides. *Biochem. Biophys. Res. Commun.* 170, 270-280 (1990).

[22] Unal Cevik, I. & Dalkara, T. Intravenously administered propidium iodide labels necrotic cells in the intact mouse brain after injury. *Cell Death Differ.* 10, 928-929 (2003).

[23] Mazzaferri, J. et al. Analyzing speckle contrast for HiLo microscopy optimization. *Opt. Express* 19, 14508 (2011).

[24] Saxena, M., Eluru, G. & Gorthi, S. S. Structured illumination microscopy. *Adv. Opt. Photon.* 7, 241-275 (2015).

[25] Gustafsson, M. G. L. et al. Three-dimensional resolution doubling in wide-field fluorescence microscopy by structured illumination. *Biophys. J.* (2008) doi:10.1529/biophysj.107.120345.

[26] Dan, D. et al. DMD-based LED-illumination Super-resolution and optical sectioning microscopy. *Sci. Rep.* 3, 1116 (2013).

[27] Santos, S. et al. Optically sectioned fluorescence endomicroscopy with hybrid-illumination imaging through a flexible fiber bundle. *J. Biomed. Opt.* 14, 030502 (2009).

[28] Glaser, A. K. et al. Light-sheet microscopy for slide-free non-destructive pathology of large clinical specimens. *Nat. Biomed. Eng.* 1, 84 (2017).

[29] Hezel, M., Ebrahimi, F., Koch, M. & Dehghani, F. Propidium iodide staining: A new application in fluorescence microscopy for analysis of cytoarchitecture in adult and developing rodent brain. *Micron* 43, 1031-1038 (2012).

[30] Philipp, K. et al. Volumetric HiLo microscopy employing an electrically tunable lens. *Opt. Express* 24, 15029 (2016).

[31] Ledig, C. et al. Photo-realistic single image super-resolution using a generative adversarial network. *Proc.—30th IEEE Conf. Comput. Vis. Pattern Recognition, CVPR 2017* 2017-January, 105-114 (2017).

[32] Sun, W. & Chen, Z. Learned Image Downscaling for Upscaling Using Content Adaptive Resampler. *IEEE Trans. Image Process.* 29, 4027-4040 (2020).

[33] Huang, G., Liu, Z., Van Der Maaten, L. & Weinberger, K. Q. Densely connected convolutional networks. *Proc.—30th IEEE Conf. Comput. Vis. Pattern Recognition, CVPR 2017* 2017-January, 2261-2269 (2017).

[34] He, K., Zhang, X., Ren, S. & Sun, J. Deep residual learning for image recognition. *Proc. IEEE Comput. Soc. Conf. Comput. Vis. Pattern Recognit.* 2016-December, 770-778 (2016).

What is claimed is:

1. A method for tomographically imaging a sample with ultraviolet (UV) excitation to yield a three-dimensional (3D) fluorescence/autofluorescence image volume, the method comprising the steps of:

(a) focal scanning of an exposed surface layer of the sample which is immersed under staining solutions for labelling and illuminated by UV light, to yield a sequence of a low-resolution (LR) translational rapid ultraviolet-excited sectioning tomography (TRUST) images;

(b) transforming the sequence of LR TRUST images into the sequence of a high-resolution (HR) TRUST images assisted with a second conditional generative adversarial network (cGAN), which improves a resolution of an imaging system or reduces an imaging time compared to directly obtaining the sequence of HR TRUST images, wherein the second cGAN is a super-resolution (SR) neural network;

(c) transforming the sequence of HR TRUST images into a sequence of virtual optically-sectioned Patterned-TRUST images with a first cGAN to enhance an axial resolution while saving time compared with the patterned-illumination microscopy;

(d) removing the imaged surface layer of the tissue block with mechanical sectioning and exposing a following/adjacent layer; and (e) repeating the steps (a)-(d) until the 3D fluorescence/autofluorescence imaging volume of the whole sample is obtained.

2. The method of claim 1, wherein the focal scanning of the exposed surface layer of a tissue block comprises the steps of:

(f) obtaining a LR TRUST image that records fluorescence and autofluorescence emission of the individual section irradiated with UV light under a uniform-illumination condition;

(g) moving the imaging device and/or or the tissue sample axially for a distance; and (h) repeating the steps (f) and (g) to yield the sequence of LR TRUST images of the sample surface layer.

3. The method of claim 1 further comprising:

training the first cGAN with a first training dataset which comprises a plurality of first training samples, wherein each training sample of the plurality of first training samples comprises a paired example of an ordinary TRUST image acquired under uniform illumination and a corresponding optically-sectioned image.

4. The method of claim 1, wherein the second cGAN is selected to be a super-resolution generative adversarial network (SRGAN), an enhanced super-resolution generative adversarial network (ESRGAN), a content adaptive resampler (CAR), or another kind of SR deep learning network.

5. A system for tomographically imaging a sample with ultraviolet (UV) excitation to yield a three-dimensional (3D) fluorescence image volume, the system comprising:

an imaging subsystem realized as a translational rapid ultraviolet-excited sectioning tomography (TRUST) system or a Patterned-TRUST system for imaging the sample with UV excitation; and one or more computers for controlling the imaging subsystem and determining the 3D fluorescence image volume, the one or more computers being configured to:

control the imaging subsystem to prepare a plurality of sections of the sample for imaging;

perform focal scanning of each exposed surface layer once it has been stained, to yield a sequence of TRUST images of the individual section;

transform the sequence of TRUST images into a sequence of high-resolution (HR) TRUST images with a second conditional generative adversarial network (cGAN), which is applied to enhance an image resolution or reduce an image scanning time;

transform the sequence of HR TRUST images into a sequence of virtual optically-sectioned TRUST images with a first cGAN to enhance an axial resolution, or to save time compared with a patterned-illumination microscopy; and collect respective sequences of virtual optically-sectioned TRUST images to form the 3D fluorescence image volume;

wherein in the focal scanning of each exposed surface layer of the sample, the one or more computers are further configured to:

(a) obtain a TRUST image that records fluorescence and autofluorescence emission of the individual section irradiated with UV light under a uniform-illumination condition;

(b) move the imaging device or tissue sample axially for a distance; and (c) repeat the steps (a) and (b) to yield a sequence of TRUST images of the individual section.

6. The system of claim 5, wherein the one or more computers are further configured to:

train the first cGAN with the first training dataset, which comprises a plurality of first training samples, wherein each first training sample comprises a paired example of an ordinary TRUST image and its corresponding optically-sectioned TRUST image.

7. The system of claim 5, wherein in transforming the sequence of TRUST images into the sequence of HR TRUST images, the one or more computers are further configured to:

use the second cGAN to transform the sequence of TRUST images into the sequence of HR TRUST images, wherein the second cGAN is a super-resolution (SR) neural network configured and trained to enhance input images in resolution, thereby reducing the imaging time compared to directly obtaining HR TRUST images.

8. The system of claim 7, wherein the second cGAN is selected to be a super-resolution generative adversarial network (SRGAN), an enhanced super-resolution generative adversarial network (ESRGAN), a content adaptive resampler (CAR), or another kind of super-resolution deep learning network.

* * * * *